(12) United States Patent
Martikka

(10) Patent No.: US 6,650,282 B2
(45) Date of Patent: Nov. 18, 2003

(54) POSITIONING EQUIPMENT

(75) Inventor: Mikko Martikka, Vantaa (FI)

(73) Assignee: Suunto Oy, Vantaa (FI)

( * ) Notice: Subject to any disclaimer, the term of this patent is extended or adjusted under 35 U.S.C. 154(b) by 0 days.

(21) Appl. No.: 10/112,142

(22) Filed: Mar. 29, 2002

(65) Prior Publication Data

US 2002/0163467 A1 Nov. 7, 2002

(30) Foreign Application Priority Data

Mar. 30, 2001 (FI) .............................................. 20010668

(51) Int. Cl.$^7$ ............................................. H04B 7/185
(52) U.S. Cl. ................................................ 342/357.05
(58) Field of Search ............................ 342/357.05, 418

(56) References Cited

U.S. PATENT DOCUMENTS 6,313,786 B1 * 11/2001 Sheynblat et al. ..... 342/357.02

* cited by examiner

Primary Examiner—Theodore M. Blum
(74) Attorney, Agent, or Firm—Steinberg & Raskin, P.C.

(57) ABSTRACT

The invention relates to a receiver of a satellite positioning system. In order to obtain reliable positions with a low sampling rate said receiver comprises: reception means (3) for receiving signals from satellites (S1, S2) in order to calculate the locations and the speeds of said satellites, measuring means (4) for measuring the doppler shifts of said signals, calculating means (5) for calculating preliminary positional coordinates of said receiver based on the locations of the satellites, the speeds of the satellites and the measured doppler shifts of said signals, pseudo-distance calculation means (6) for calculating pseudo-distances between the receiver and said satellites based on propagation times of signals transmitted at predetermined moments from said satellites to said receiver, comparison means (7) for comparing the calculated pseudo-distances with distances calculated based on said preliminary positional coordinates and the locations of the satellites, and for controlling said pseudo-distance calculation means for recalculating the pseudo-distances under predetermined conditions, and means (8) for calculating the position of said receiver based on the calculated pseudo-distances and the locations of said satellites.

5 Claims, 2 Drawing Sheets

POSITIONING EQUIPMENT

BACKGROUND OF THE INVENTION

1. Field of the Invention

This invention relates to positioning systems. More particularly this invention relates to satellite based positioning systems.

2. Description of the Prior Art

The GPS-system (Global Positioning system) is an example of a prior art positioning system, where the position of a receiver is calculated based on signals transmitted from satellites to the receiver. In the following the invention will, by way of example, be explained mainly in connection with the GPS-system. It should, however, be observed that the present invention can be utilized also in other positioning systems.

A GPS-satellite transmits continuously a signal L1 on the 1575.42 MHz frequency. The L1 signal contains a pseudo-random-code, almanac data and ephemeris data. The pseudo-random-code identifies the transmitting satellite. The almanac data contains the approximate orbits of the satellites. This information is stored in the memory of the receiver so it knows the orbits of the satellites. Any satellite can travel slightly out of orbit. The corrected and exact orbit-parameters of a satellite are included in the ephemeris data. A GPS satellite further transmits other important information such as status of the satellite, current date and time.

A GPS receiver calculates its position based on the distance to a number of satellites whose positions are known for the receiver. If three or more satellites are available, then the receiver is able to calculate a 2D position, in other words the latitude and longitude. With four or more satellites available, a GPS receiver is able to calculate a 3D position which includes latitude, longitude and altitude.

The pseudo-distance between a GPS receiver and a satellite is calculated based on the propagation time needed for a signal transmitted from the satellite to reach the receiver. In order to make this calculation possible a GPS satellite transmits an own unique C/A code (Course/Acquisition) at predetermined moments, with a 1 ms interval. The GPS receiver is generating the same C/A code and it tries to match it up to the C/A code received from the satellite. The GPS receiver compares the two codes to determine how much it needs to delay (or shift) its code to match the satellite code. This delay time (shift) is multiplied by the speed of light to get the pseudo-distance.

The reason why the above mentioned calculation results in a pseudo-distance rather than in the actual distance, is that the internal clock of a GPS receiver is not as precise as the clock of a satellite. It is, however, possible to determine the position of a GPS receiver based on the pseudo-distance to four satellites whose positions are known, by recomputing the four fixes until the clock error disappears.

A problem with the above described prior art navigation system is that the C/A code transmitted by a satellite is repeated with relatively small intervals (1 ms). Thus if the sampling rate of the receiver is relatively low (such as 1 kHz for instance) it is possible that the receiver will lock to the wrong C/A code. If the receiver instead of locking to the correct C/A code locks to the previous or to the following C/A code, then the travel time measured by the receiver will have an error of 1 ms, which will lead to an error of 300 km in the calculated pseudo-distance.

It is an object of the present invention to provide a solution which makes it possible to avoid the above mentioned error.

It is a further object of the present invention to provide a solution which makes it possible to obtain reliable positions with a receiver using a low sampling rate.

It is still a further object of the present invention to obtain a solution which makes it possible for a receiver to reduce the time and the amount of calculations needed in order to obtain a first position.

SUMMARY OF THE INVENTION

The objects of the invention are achieved with a method for determining positional coordinates of a receiver, comprising: receiving signals from satellites, said signals including at least information which can be used to calculate the locations and the speeds of said satellites, measuring a doppler shift of said received signals, calculating a relative speed of said satellites based on the measured doppler shifts, calculating preliminary positional coordinates for said receiver based on the locations of the satellites, the speeds of the satellites and the relative speeds of the satellites, calculating pseudo-distances between said satellites and said receiver based on the propagation times for signals transmitted at predetermined moments from said satellites to said receiver, correcting said pseudo-distances based on said preliminary positional coordinates and the locations of the satellites, and determining said positional coordinates of said receiver based on the corrected pseudo-distances and the locations of said satellites.

The objects of the present invention are according to a second aspect of the invention achieved with a receiver of a satellite positioning system, said receiver comprising: reception means for receiving signals from satellites in order to calculate the locations and the speeds of said satellites, measuring means for measuring the doppler shifts of said signals, calculating means for calculating preliminary positional coordinates of said receiver based on the locations of the satellites, the speeds of the satellites and the measured doppler shifts of said signals, pseudo-distance calculation means for calculating pseudo-distances between the receiver and said satellites based on propagation times of signals transmitted at predetermined moments from said satellites to said receiver, comparison means for comparing the calculated pseudo-distances with distances calculated based on said preliminary positional coordinates and the locations of the satellites, and for controlling said pseudo-distance calculation means for recalculating the pseudo-distances under predetermined conditions, and means for calculating the position of said receiver based on the calculated pseudo-distances and the locations of said satellites.

The present invention utilizes the doppler shift of signals received from satellites in order to determine the relative speeds of the satellites, as seen from the receiver. The relative speeds of the satellites together with the estimated positions of the satellites and the actual speeds of the satellites can be used to determine a preliminary position of the receiver. The receiver can estimate the position of a satellite as the orbit of the satellite is known by using its own internal clock. The estimated position is not exactly correct due to the error of the internal clock. However, the preliminary position obtained in the above described manner is accurate enough to detect if there is a significant error in a pseudo-distance calculated between the receiver and a satellite. Thus an error caused by the fact that the receiver has locked to a wrong C/A-code can be detected, and the error in the pseudo-distance can be corrected.

The present invention is very useful in order to determine the first position of a receiver, in other words in a situation where no prior position is available. The invention involves significant advantages when it is utilized in, for instance, portable receivers, as it makes it possible to obtain a reliable position even though the sampling rate used by the receiver is relatively low. A low sampling rate means that the energy consumption of the receiver can be kept at a low level, which is a significant advantage in a portable device where the source of energy is a battery.

The preferred embodiments of the receiver of the invention are disclosed in the dependent claims 2–5.

BRIEF DESCRIPTION OF THE DRAWINGS

In the following the present invention will be described in closer detail by way of example and with reference to the attached drawings, in which.

DESCRIPTION OF THE PREFERRED EMBODIMENTS

Figure 1:
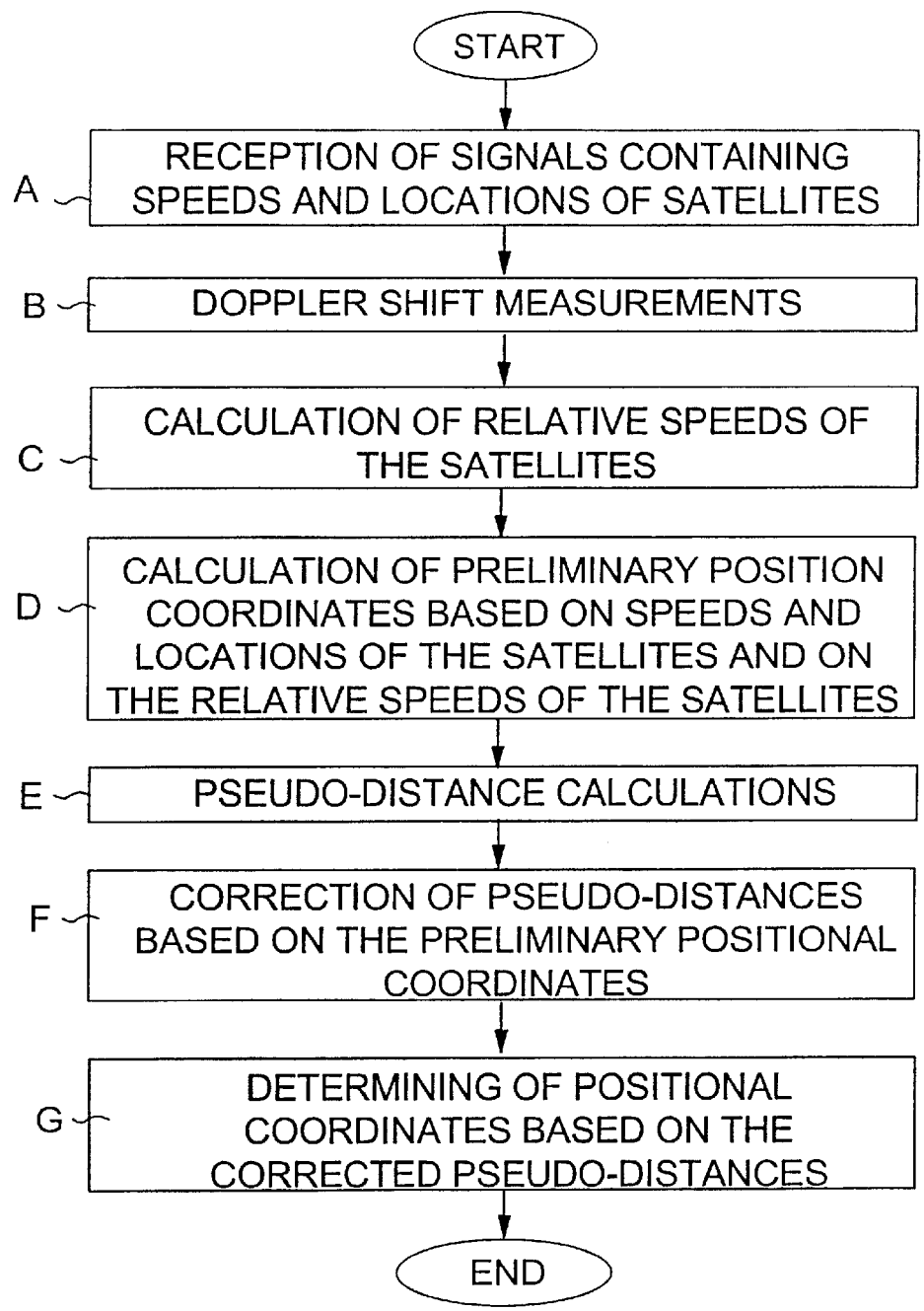
FIG. 1 is a flow diagram of a first preferred embodiment of the present invention.

FIG. 1 is a flow diagram of a first preferred embodiment of the present invention. The flow diagram of FIG. 1 can be utilized for instance in order to determine the location of a GPS receiver.

In block A signals containing at least information, which makes it possible to calculate the speeds and locations of satellites, is received. The corrected and exact orbit-parameters of a satellite is in the GPS system included in the ephemeris data transmitted by the satellite. The ephemeris data further includes other important information. In the following it is assumed that information is available from four satellites, which is the minimum in order to obtain a 3D position including latitude, longitude and altitude of a receiver.

A GPS receiver can use its own internal clock to estimate the position of a satellite based on the information received in block A. However, the estimated position is not absolutely correct, due to the fact that the internal clock of the receiver usually does not have the exact time.

In block B the doppler shift of the received signals is measured separately for each satellite. The measured doppler shift is utilized in block C for calculation of the relative speeds of the satellites, as seen from the receiver. It is important to take into account also the drift of the internal clock of the receiver, as this drift will effect the doppler measurements.

In block D the preliminary position coordinates of the satellites is calculated based on the speeds and the locations of the satellites and on the relative speeds of the satellites. The following formula can be used in the present invention:

$$(V^T*(R-r)/et)+d=D,$$

wherein
— R is the location (coordinates) of the satellite,
— v is the speed of the satellite (vx, vy, vz),
— r is the location of the receiver (x, y, z),
— et is the distance between the satellite and the receiver,
— d is the drift of the internal clock of the receiver, and
— D is the result of the doppler measurement (relative speed).

The above formula can also be presented in a form which is suitable for iteration:

$$(V^T*\Delta r)+(\Delta d*et)=-(D-d)*et+v*(R-r)$$

The drift term and the location coordinates are in the above formula presented such that:
$x \to x+\Delta x$,
$y \to y+\Delta y$,
$z \to z+\Delta z$,
$d \to d-\Delta d$, A similar formula is obtained for each satellite. The result is a system of equations which can be solved by using the least squares method. The system of equations has the following form: Ax=b, wherein $$A = \begin{pmatrix} v_x^{(1)} & v_y^{(1)} & v_z^{(1)} & et^{(1)} \\ v_x^{(2)} & v_y^{(2)} & v_z^{(2)} & et^{(2)} \\ \vdots & \vdots & \vdots & \vdots \\ v_x^{(n)} & v_y^{(n)} & v_z^{(n)} & et^{(n)} \end{pmatrix}, x = \begin{pmatrix} \Delta x \\ \Delta y \\ \Delta z \\ \Delta d \end{pmatrix} \text{ and}$$

$$b = \begin{pmatrix} -(D^{(1)}-d)*et^{(1)} + v^{(1)}*(R^{(1)}-r) \\ -(D^{(2)}-d)*et^{(2)} + v^{(2)}*(R^{(2)}-r) \\ \vdots \\ -(D^{(n)}-d)*et^{(n)} + v^{(n)}*(R^{(n)}-r) \end{pmatrix}$$

The solution is: $x=(A^T A)^{-1}A^T b$.

When the position is unknown the iteration is started from the center point of the earth. The drift-term of the clock is adjusted to zero. The result is iterated a few times (for instance four times) in order to improve the accuracy. The location coordinates and the drift-term is updated such that:
$x^{(new)} \to x^{(old)}+\Delta x$,
$y^{(new)} \to y^{(old)}+\Delta y$,
$z^{(new)} \to z^{(old)}+\Delta z$,
$d^{(new)} \to d^{(old)}+\Delta d$, The result of the iteration carried out in block D are the preliminary position coordinates of the receiver.

It should be observed that the above calculations are only one example of how to calculate the preliminary coordinates of the receiver. It is naturally possible to carry out the calculations with some alternative method, for instance by utilizing the so called extended Kalman algorithm.

In block E the pseudo-distances to the satellites are calculated as in prior art solutions. The pseudo-distance between a GPS receiver and a satellite is calculated based on the propagation time needed for a signal (containing a C/A code) transmitted from the satellite to reach the receiver. The GPS receiver compares the two codes to determine how much it needs to delay (or shift) its code to match the satellite code. This delay time (shift) is multiplied by the speed of light to get the pseudo-distance.

In block F the calculated pseudo-distances are corrected, if necessary. This can be done (for each satellite) such that the distance between the receiver and a satellite is calculated based on the location of the satellite and the preliminary position coordinates of the receiver. The calculated distance is compared to the pseudo-distance of the same satellite. If the receiver has locked to the wrong C/A-code, such as to the previous or to the next, then there is an error of 1 ms in the measured propagation time, which means that there is an error of 300 km in the calculated pseudo-distance. Such an error can be detected in the comparison of block F, which also makes it possible to correct the pseudo-distance, for instance by adjusting the receiver to lock into the correct C/A code from that moment on.

When it has been assured in block F that the receiver has locked into the correct C/A code for all the satellites, which means that corrected pseudo-distances exists to all of the satellites, then the position of the receiver is calculated in block G. The positional coordinates are calculated, as in prior art solutions, based on the pseudo-distances of the satellites and on the locations of the satellites.

Figure 2:
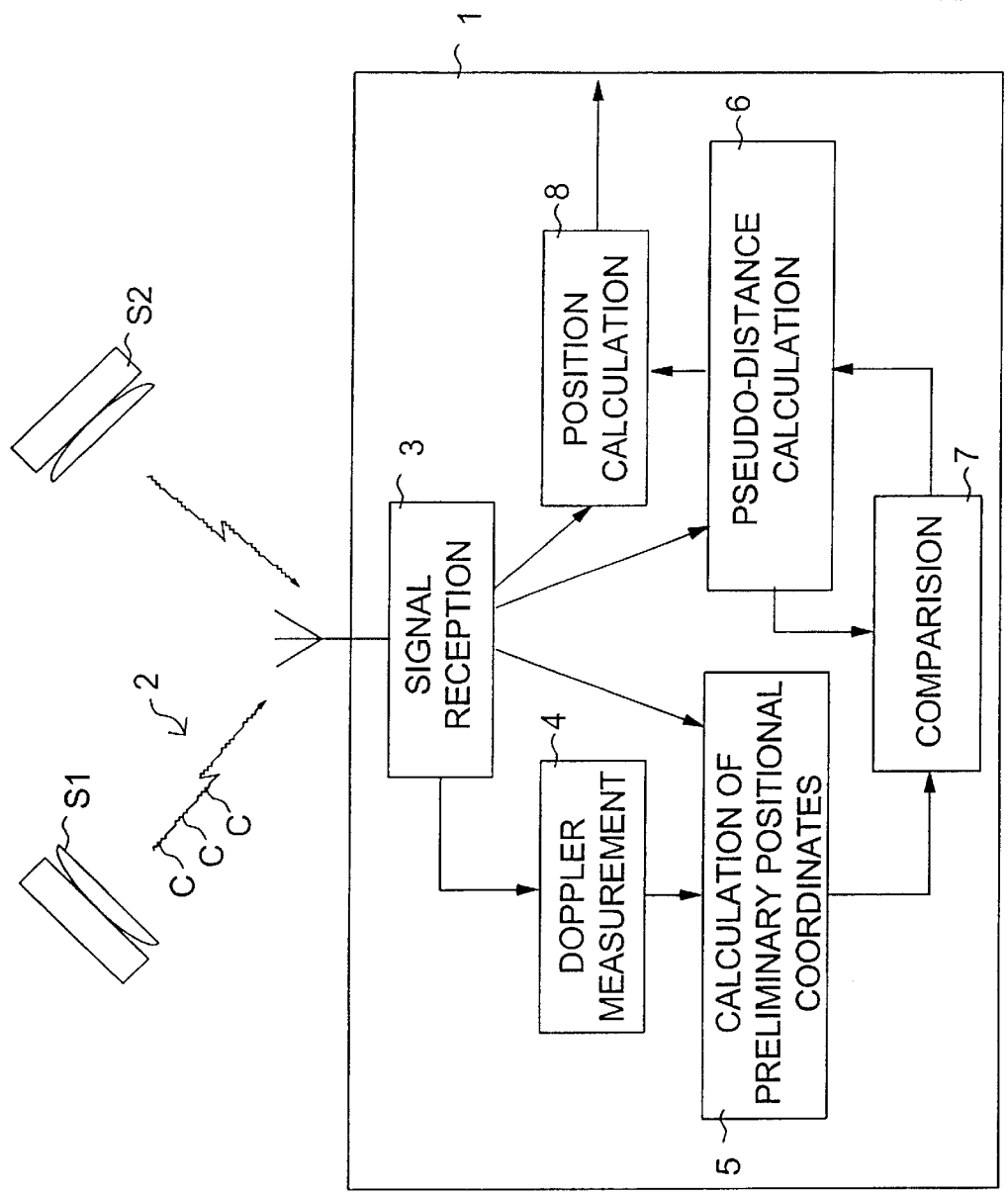
FIG. 2 is a block diagram of a satellite positioning system where a receiver according to the present invention is used.

FIG. 2 is a block diagram of a satellite positioning system where a receiver according to the present invention is used. It is by way of example assumed that the satellite positioning system of FIG. 2 is a GPS system, in which case the method described in connection with FIG. 1 can be applied in the system of FIG. 2. The receiver 1 seen in FIG. 2 can be a portable receiver or a wearable receiver, such as a receiver integrated into a wrist watch, in which case the receiver 1 includes a battery (not shown in the figure) as its source of energy.

The GPS receiver 1 receives signals from GPS satellites S1 and S2. It should be observed that signals from four satellites are needed to obtain a 3D position, even though only two satellites are shown in FIG. 2 (for reasons of clarity).

FIG. 2 illustrates that the satellite S1 is continuously transmitting a signal 2 on the 1575.42 MHz frequency. This signal 2 contains among other things a pseudo-random-code, almanac data and ephemeris data. The reception block 3 of the receiver 1 receives the signal 2 and processes the signal in order to retrieve the necessary data. This data includes the orbit parameters of the satellite, which are used by block 3 to calculate the location of the satellite and the speed of the satellite by using the time of the internal clock of the receiver. The reception block 3 forwards the location and the speed of the satellite to block 5. The reception block 3 also forwards signals to the doppler measurement block 4, where the relative speed of the satellite, as seen from the receiver, is calculated based on the measured doppler shift.

It is assumed that the receiver receives signals from at least four different satellites. Thus block 5 of the receiver 1 is able to calculate preliminary positional coordinates based on the locations and the speeds of the satellites and on the calculated relative speeds of the satellites. The preliminary positional coordinates can be calculated as explained in connection with FIG. 1. The preliminary positional coordinates are fed to the comparison block 7.

The signal 2 transmitted by the satellite S1 also includes a predetermined code C. This code C (C/A code, Course/Acquisition) is unique for the satellite in question and it is transmitted precisely at predefined moments of time with intervals of 1 ms. Block 6 of the receiver is generating the same C/A code and it tries to match it up to the C/A code received from the satellite. The receiver compares the two codes to determine how much it needs to delay (or shift) its code to match the satellite code. Thus block 6 is aware of the delay (or shift) for each satellite. This delay (or shift) is multiplied by the speed of light in order to obtain the pseudo-distance to the satellite in question. The calculated pseudo-distances are forwarded from block 6 to the comparison block 7 and to block 8.

The comparison block 7 receives (as explained earlier) from block 5 the locations of the satellites and the preliminary positional coordinates of the receiver. Thus the comparison block 7 is able to calculate the distances between the preliminary positional coordinates and the locations of the satellites. The calculated distances are compared to the pseudo-distances received from block 6. If the receiver has locked onto the wrong code C for one of the satellites, then there will be a difference of 300 km (or more) between the pseudo-distance and the distance calculated based on the location of the satellite and the preliminary positional coordinates of the receiver. In that case the comparison block 7 will control the pseudo-distance calculation block 6 to lock onto another code, which means that the calculated pseudo-distance will be corrected as soon as block 6 will make the following pseudo-distance calculation.

The receiver 1 further includes a position calculation block 8, which will receive the locations of the satellites from block 3 and the (eventually corrected) pseudo-distances from block 6. Thus block 8 is able to calculate the positional coordinates of the receiver as in prior art solutions.

One significant advantage obtained by the receiver of FIG. 2 is that the sampling rate used by the receiver in determining the precise reception moment of the C/A code included in the signal 2, can be kept at a low level. It is sufficient to use a sampling rate around 1 kHz in solutions where the C/A code is repeated with intervals of 1 ms. Such a low sampling rate is very advantageous in for instance portable receivers or wearable receivers (such as receivers integrated into a wrist watch), where the energy is obtained from a battery. The reason for this is that each sample leads to an amount of calculations which naturally will require energy. A low sampling rate thus reduces the energy consumption.

In FIG. 2 the receiver 1 has been illustrated with functional blocks 2–8. It is, however, important to observe that the actual construction of the receiver might deviate from what is shown in FIG. 2. The functions of the blocks in FIG. 2 can in practice be realized with one or several circuits or computer programs, or alternatively as a combination of circuits and programs. Thus it is also possible that the functions of the receiver are not realized precisely with the illustrated blocks, but instead the functions of two or more blocks might be combined into one circuit or program.

It is to be understood that the above description and the accompanying Figures are only intended to illustrate the present invention. It will be obvious to those skilled in the art that the invention can be varied and modified also in other ways without departing from the scope and spirit of the invention disclosed in the attached claims.

What is claimed is:

1. A method for determining positional coordinates of a receiver, said method comprising:

receiving signals from satellites, said signals including at least information which can be used to calculate the locations and the speeds of said satellites, measuring a doppler shift of said received signals, calculating a relative speed of said satellites based on the measured doppler shifts, calculating preliminary positional coordinates for said receiver based on the locations of the satellites, the speeds of the satellites and the relative speeds of the satellites, calculating pseudo-distances between said satellites and said receiver based on the propagation times for signals transmitted at predetermined moments from said satellites to said receiver, correcting said pseudo-distances based on said preliminary positional coordinates and the locations of the satellites, and determining said positional coordinates of said receiver based on the corrected pseudo-distances and the locations of said satellites.

2. A receiver of a satellite positioning system, said receiver comprising:

reception means for receiving signals from satellites in order to calculate the locations and the speeds of said satellites, measuring means for measuring the doppler shifts of said signal, calculating means for calculating preliminary positional coordinates of said receiver based on the locations of the satellites, the speeds of the satellites and the measured doppler shifts of said signals, pseudo-distance calculation means for calculating pseudo-distances between the receiver and said satellites based on propagation times of signals transmitted at predetermined moments from said satellites to said receiver, comparison means for comparing the calculated pseudo-distances with distances calculated based on said preliminary positional coordinates and the locations of the satellites, and for controlling said pseudo-distance calculation means for recalculating the pseudo-distances under predetermined conditions, and means for calculating the position of said receiver based on the calculated pseudo-distances and the locations of said satellites.

3. The receiver of claim 2, wherein said receiver is a wearable receiver whose energy source consists of a battery.

4. The receiver of claim 2, wherein said pseudo-distance calculation means utilize a low sampling rate in order to determine said propagation times.

5. The receiver of claim 2, wherein said receiver is a portable device whose enregy source consists of a battery.

* * * * *